United States Patent [19]
Ramspacher et al.

[11] Patent Number: 5,455,413
[45] Date of Patent: Oct. 3, 1995

[54] MECHANISM FOR RETAINING AN ELECTRONICALLY READABLE CARD IN AN ELECTRONIC DEVICE

[75] Inventors: Robert J. Ramspacher, Fishers; Thomas E. Freeman, New Whiteland, both of Ind.

[73] Assignee: Thomson Consumer Electronics, Inc., Indianapolis, Ind.

[21] Appl. No.: 220,843

[22] Filed: Mar. 31, 1994

[51] Int. Cl.⁶ .................................................. G06K 7/00
[52] U.S. Cl. ........................................... 235/486; 269/903
[58] Field of Search ................................. 235/426, 441, 235/467, 454; 29/740, 760; 269/903, 900, 902, 961, 254 R, 253

[56] References Cited

U.S. PATENT DOCUMENTS

| | | | |
|---|---|---|---|
| 4,951,176 | 8/1990 | Bergfried et al. | 361/400 |
| 5,043,562 | 8/1991 | Hautvast et al. | 235/441 X |
| 5,276,317 | 1/1994 | Ozay et al. | 235/486 |

FOREIGN PATENT DOCUMENTS

| | | | |
|---|---|---|---|
| 2578072 | 8/1986 | France | 235/441 |

*Primary Examiner*—Donald Hajec
*Assistant Examiner*—Thien Minh Le
*Attorney, Agent, or Firm*—Joseph S. Tripoli; Eric P. Herrmann; Frederick A. Wein

[57] ABSTRACT

A device for retaining an electronically readable card in an electronic device includes a substantially V-shaped resilient retainer dimensioned to engage a portion of the card while the rest of the card remains exposed for electronic reading purposes. The resilient retainer is held in the electronic device by a clip having a first detent member. The retainer includes a second detent member which engages the first detent member as the retainer enters the slit during insertion of the card into the electronic device. The thicknesses of the retainer and the card and the width of the slit are selected so that the resilient retainer is firmly held in the electronic device.

10 Claims, 2 Drawing Sheets

MECHANISM FOR RETAINING AN ELECTRONICALLY READABLE CARD IN AN ELECTRONIC DEVICE

This invention relates generally to pay-to-view television and particularly to a mechanism for retaining an electronically readable card in a pay to view television receiver.

BACKGROUND

In pay-to-view television a so-called "smart card" is inserted into the television receiver prior to viewing the intended program. The insertion of the card accomplishes several functions, one of which is the identification of the user as an authorized user. Another function is the billing of the proper viewer of the selected pay-for-view program. Problems can arise with such cards because they can unintentionally fall out, or be removed by children or other unintended person, and as a consequence the cards often get lost. There is a need for a mechanism for retaining the smart card in the television receiver in a snug fashion which enables it to be accurately read and which prevents it from accidentally falling out or being inadvertently removed by children. The invention fulfills these needs.

SUMMARY

A mechanism for retaining an electronically readable card in an electronic device includes a bezel having an opening for inserting and holding the card in the electronic device. A resilient clip, which is dimensioned and configured to snap into the opening, includes a slit and has a detent member. A substantially V-shaped resilient retainer is dimensioned to engage one portion of the card while the remainder of the card remains exposed for electronic reading purposes. The resilient retainer includes a second detent member which engages the first detent member the projection as the retainer enters the slit during insertion of the card into the electronic device, to firmly hold the resilient retainer in the electronic device.

DETAILED DESCRIPTION

Figure 1:
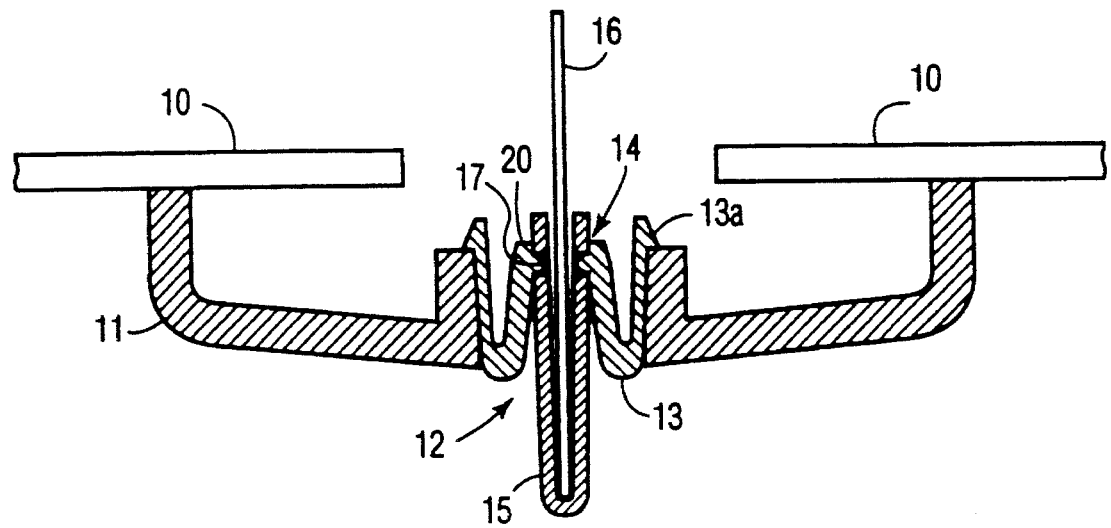
FIG. 1 is a cross-section of a preferred embodiment.

In FIG. 1 a bezel 11 includes an opening 12 and is permanently affixed to a television receiver 10, shown broken away, which can be used to view pay-to-view television programs. A resilient clip 13 is configured to be congruent to the opening 12 and is dimensioned to snap into the opening. The clip is held in the bezel 11 by lips 13a The resilient clip 13 includes a longitudinal slit 14. The slit 14 is dimensioned in length and width to snugly receive a V-shaped resilient retainer 15 which is used to hold the "smart card" 16 in the television receiver. The retainer 15 firmly engages the full length of the card 16. The width of the resilient retainer 15 is selected to engage only that portion of the width of the card 16 required to ensure that the card cannot accidentally fall from the receiver or be inadvertently removed by a small child or some other person who is not intended to remove the card. A substantial portion of the width of the smart card 16 remains uncovered by resilient retainer 15 and extends into the receiver to be read by an electronic mechanism of known type to identify the receiver, bill the appropriate customer and what ever other functions are programmed onto the card.

Figure 2:
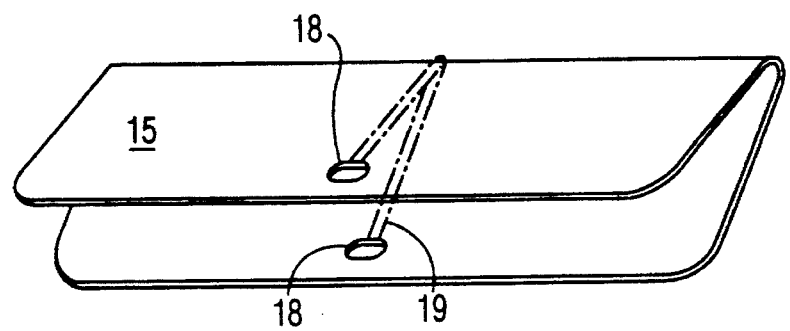
FIG. 2 shows an-embodiment of a resilient V-shaped retainer in detail.
Figure 3:
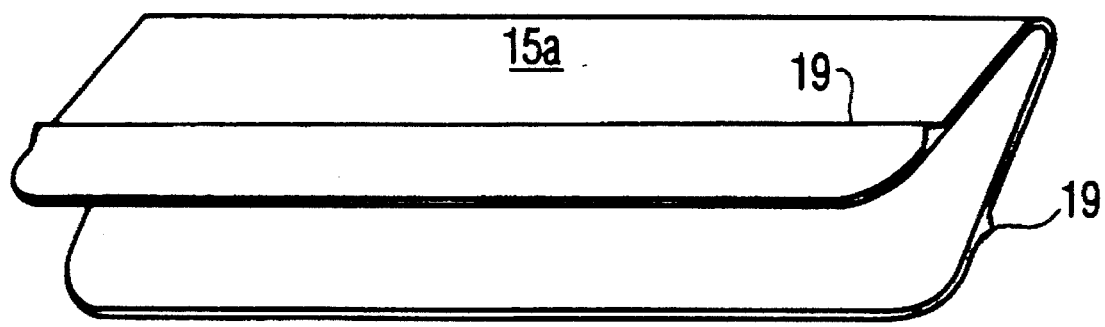
FIG. 3 is another embodiment of the resilient V-shaped retainer.

As shown in FIG. 2, resilient retainer 15 includes apertures 18 on both sides. Resilient clip 13 includes projections 17 which engage the apertures 18 to firmly hold the resilient retainer 15 and smart card 16 in the desired position in the TV receiver. The thicknesses of retainer 15, card 16 and the width of slit 14 are selected so that clip 13 biases the retainer 15 against the card 16 to firmly hold the card in the holder 11. A spring 19 can be embedded in or arranged in the resilient retainer 15 to increase the resilience of the retainer.

In FIG. 2 the detent member for the resilient V-shaped retainer is composed of ribs 19 extending along the length of both sides of the retainer 15. The ribs 19 engage the edge 20 of resilient clip 13 to hold the resilient retainer 15 in the TV receiver. In this embodiment, the ribs 19 and edge 20 replace the projections 17 and apertures 18.

Figure 4:
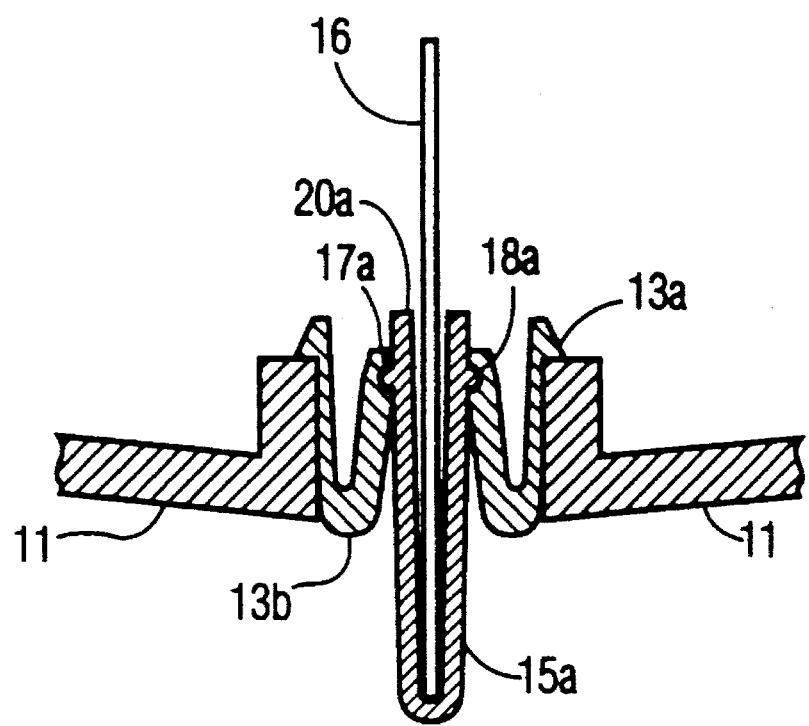
FIG. 4 is a cross section of another preferred embodiment, shown partially broken away.

The FIG. 4 embodiment is similar to the FIG. 1 embodiment. However, resilient clip 13 includes apertures 18a (shown as blind holes) and resilient retainer 15a includes projections 17a.

We claim:

1. A mechanism for retaining an electronically readable card in an electronic device having a holder including an opening for inserting and holding said card in said electronic device, said mechanism including:
   a resilient clip dimensioned and configured to snap into said opening and including a slit, said clip also includes a first detent member;
   a substantially V-shaped resilient retainer dimensioned to engage one portion of said card while another portion of said card remains exposed for electronic reading purposes, said retainer including a second detent member for engaging said first detent member when said retainer enters said slit during insertion of said card into said electronic device.

2. The mechanism of claim 1 wherein said first detent member includes at least one projection extending into said slit, and said second detent member includes at least one aperture for receiving said projection.

3. The mechanism of claim 1 wherein said first detent member includes at least one aperture, and said second detent member includes at least one projection for receiving said aperture.

4. The mechanism of claim 1 wherein said first detent member includes an edge of said resilient clip and said second detent member includes at least one rib extending along a selected length of said resilient retainer.

5. The mechanism of claim 2 wherein the thicknesses of said resilient retainer and said card and the width of said slit are selected whereby said clip biases said retainer against said card to firmly engage said retainer against said card.

6. The mechanism of claim 3 wherein the thicknesses of said resilient retainer and said card and the width of said slit are selected whereby said clip biases said retainer against said card to firmly engage said retainer against said card.

7. The mechanism of claim 4 wherein the thicknesses of said resilient retainer and said card and the width of said slit are selected whereby said clip biases said retainer against said card to firmly engage said retainer against said card.

8. The mechanism of claim 1 further including a spring for biasing said resilient retainer open.

9. The mechanism of claim 2 further including a spring for biasing said resilient retainer open.

10. The mechanism of claim 3 further including a spring for biasing said resilient retainer open.

* * * * *